(12) United States Patent
Bertone

(10) Patent No.: US 6,419,120 B1
(45) Date of Patent: Jul. 16, 2002

(54) MULTI-FLAVORED HOT BEVERAGE DISPENSER

(75) Inventor: Claudio Bertone, St-Leonard (CA)

(73) Assignee: Bertone Holdings Inc., St. Laurent (CA)

(*) Notice: Subject to any disclaimer, the term of this patent is extended or adjusted under 35 U.S.C. 154(b) by 0 days.

(21) Appl. No.: 09/629,449

(22) Filed: Jul. 31, 2000

(30) Foreign Application Priority Data

Jul. 12, 2000 (CA) .............................. 2313794

(51) Int. Cl.$^7$ ................................ B67D 5/56

(52) U.S. Cl. ................... 222/129.4; 222/146.5

(58) Field of Search ................. 222/129.1, 129.3, 222/129.4, 132, 135, 144.5, 145.1, 145.5, 145.6, 146.2, 146.5

(56) References Cited

U.S. PATENT DOCUMENTS

| | | | |
|---|---|---|---|
| 4,595,131 A | * | 6/1986 | Ruskin et al. ............ 222/129.1 |
| 4,651,862 A | * | 3/1987 | Greenfield, Jr. ........... 222/129.1 |
| 5,265,518 A | * | 11/1993 | Reese et al. .................. 99/280 |
| 5,344,050 A | * | 9/1994 | Ficken ..................... 222/129.4 |
| 6,202,894 B1 | * | 3/2001 | Struminski et al. ...... 222/129.3 |

* cited by examiner

Primary Examiner—J. Casimer Jacyna
(74) Attorney, Agent, or Firm—Blake Cassels & Graydon LLP; Terry L. Leier (57) ABSTRACT

Discloses a multi-flavour hot beverage dispenser apparatus adapted to dispense a selected flavour hot drink. The dispenser apparatus has hopper to hold a base powder. The hopper includes a hopper dispenser outlet including a motor driven auger to dispense the base powder from the hopper and a hot water boiler and hot water dispense valve. The hot water boiler has controlled heating means to heat the water to the desired temperature. A plurality of liquid flavour dispensers is provided with one or more dispensers selectively activatable to dispense a flavour syrup to flavour the dispensed hot drink to the desired flavour. The liquid flavouring supply is remote from the beverage dispenser allowing a compact sized dispenser which requires minimal counter space that does not increase with increasing flavour selection offerings. A mixer mixes the hot drink constituents to produce the selected flavour of hot drink indicated by a user by depressing a dispense key corresponding to the desired size and flavour of drink to be dispensed. A portion controlled or push and hold dispense cycle is described. In addition, drink constituent supply sensors are disclosed which operate to disable hot drink dispensing when a supply is low.

24 Claims, 5 Drawing Sheets

MULTI-FLAVORED HOT BEVERAGE DISPENSER

FIELD OF THE INVENTION

This invention relates generally to apparatus for dispensing beverages constituted from hot water, powder and flavouring syrups. More particulars, the apparatus relates to automated dispensing apparatus to produce a hot beverage, such as, hot chocolate, hot cappuccino, hot powdered teas and the like, from heated water supply, a base powder and a flavouring syrup selected from one or more of a plurality of syrups.

BACKGROUND TO THE INVENTION

Heretofore, hot beverages, such as hot Cappuccino and hot chocolate have been typically dispensed from automated dispensing apparatus having a product container, a boiler to heat water, a solenoid dispense valve, and a mixing system. Where the drink is a hot drink product, the flavouring product is typically a powder. Consequently, the powdered drink constituent, for example cappuccino, is maintained within a product hopper container. Where a variety of flavours are dispensed from the apparatus, a corresponding product hopper container is utilized for each flavour variety. When the product is to be dispensed, an activation button is depressed and the selected powder is dispensed from its hopper container into the mixing system. At the same time, a hot water solenoid valve opens to allow the entry of hot water into the mixing system. The powdered flavour, for example cappuccino, is mixed with the water and dispensed through the mixing system. As each of the available flavouring powders is maintained in a separate hopper, there are consequently several hoppers required to provide for the choice of drinks available from the dispenser. Thus, with the aforementioned dispensing systems available in the market today, the flavouring powders, for example, the cappuccino powders are pre-flavoured with a variety of flavourings. For example, providing a French vanilla cappuccino flavour requires French vanilla cappuccino powder and an associated product hopper container; an amaretto cappuccino flavour would be dispensed from the amaretto cappuccino powder product hopper container; and an Irish cream cappuccino flavour dispensed from the Irish cream cappuccino powder product container and so forth. An example of the type of multi-flavour beverage dispensers available is disclosed in U.S. Pat. No. 5,927,553 to Ford which provides a powdered beverage mixing and dispensing apparatus having three powdered flavour product hoppers each with associated mixing and dispensing apparatus.

Where the operator desires to offer a variety of flavours, generally three flavours are made available. Providing a multi-flavour dispenser capable of dispensing three flavours is considered the maximum number of flavours that can conveniently be dispensed from a multi-flavour dispenser. For multi-flavour dispensers, a three flavour dispenser has become a standard multi-flavour dispense product offering in the industry. The reason that the industry standard has been limited to three flavours, is that to add an additional new flavoured cappuccino to the machine, the dispenser will become bigger and wider. For example, the average hot drink or cappuccino dispensers available are approximately 14" wide. For a single flavour dispenser, a large product hopper container is provided which provides the greatest possible number of drinks dispensable without requiring refilling servicing. When a multi-flavour product dispense is provided, multiple product hopper containers are provided with a consequent decrease in the storage volume available to any one product. Thus, when the variety of product flavours available increases to three, the product hopper size for each individual product flavour is decreased. Consequently, the dispenser apparatus must be refilled more frequently to refill each of the smaller product hopper containers as they become emptied, unless, of course, the identical number of drinks of each flavour is dispensed.

To provide additional flavours beyond three requires the operator to purchase an additional unit to hold additional product hopper containers and associated equipment including an additional dispense valve, additional mixing system—in essence, a second dispenser apparatus. However, in the food service industry, counter space is a valuable commodity. Therefore, the operators are not inclined to add any additional flavours to support extra drink flavouring choice beyond three because the equipment to provide extra choices beyond three would take up too much additional counter space. Put another way, the incremental increase in returns from providing an extra flavour is not justified by the added revenues obtained from the use of additional counter space. As a result, the operator has turned away some customers who may appreciate alternate flavours because it wouldn't be worth the extra expense of taking up additional counter space.

SUMMARY OF THE INVENTION

The present invention provides apparatus that conserves counter space while being able to provide multi-flavour products to their customers.

The present invention provides a multi-flavour dispenser that is adapted to dispense more than three flavours while conserving counter space to the same requirement as needed for a single flavour dispenser or a multi-flavour dispenser capable of dispensing three flavours.

Moreover, the present invention provides a multi-flavour dispenser apparatus which requires less frequent refill servicing to support a multi-flavour choice than traditional multi-flavour dispensing apparatus.

The apparatus of the present invention includes a system for dispensing a base powder, including means for dispensing hot water, a mixing system to mix the base powder and hot water, and a flavouring system which adds flavours to the base powder in order to dispense the desired flavour and a control activatable to dispense the base powder, the water and the flavour dosing systems and to mix the dispensed constituents. The flavourings are liquid flavourings that are located remotely from the counter top dispenser and the flavours are supplied to the dispenser for mixing with the other hot drink constituents by pump or gravity feed.

In one of its aspects, the invention provides apparatus to dispense a hot drink having a hopper with a hopper dispenser outlet including a motor driven auger dispenser along a bottom side thereof operable to dispense a base powder from the hopper dispenser outlet in response to a powder dispense signal and a hot water boiler with a water inlet and a water outlet, the boiler including means to apply controlled heating to water contained in the boiler and a hot water dispensing means operable to dispense water via the water outlet in response to a water dispense signal. The invention includes a plurality of liquid flavour dispensers, each liquid flavour dispenser is selectively activatable to dispense a flavour syrup from a flavour syrup supply. A mixer means has an outlet port and the mixer means is in communication with the hopper dispenser outlet, the water dispensing means and each liquid flavour dispenser. The mixer means is adapted to mix the hot drink constituents dispensed from these dispensers and provide the mixed hot drink constituents from the outlet port. Control means is included having user activatable selection means to produce the powder dispense signal, water dispense signal and a selected flavour dispense signal in response to user activation of the selection means.

In another of its aspects, the invention provides apparatus to dispense a hot drink comprising a hopper with a hopper dispenser outlet including a motor driven auger dispenser along a bottom side thereof activatable to dispense a base powder from the hopper dispenser outlet. A hot water boiler, with a water inlet and a water outlet, is included and has means to apply controlled heating to water contained in the boiler. The boiler has a hot water dispensing means activatable to dispense water via the water outlet. A plurality of liquid flavour dispensers is included, each liquid flavour dispenser is selectively activatable to dispense a flavour syrup from a flavour syrup supply and a mixer means having an outlet port. The mixer means is in communication with the hopper dispenser outlet, water outlet and each of the flavour dispensers and is adapted to mix the hot drink constituents dispensed from the dispensers and to provide the mixed hot drink constituents at the mixer outlet port. Also included is activation means to activate the auger, hot water dispenser and a selected liquid flavour dispenser in response to user manipulation whereby a user selected flavoured hot drink is dispensed from the mixer outlet port.

And in yet another of its aspects, the invention provides apparatus to dispense a hot drink comprising: a hopper with a hopper dispenser outlet including a motor driven auger dispenser along a bottom side thereof activatable to dispense a base powder from the hopper dispenser outlet and a hot water boiler with a water inlet and a water outlet, the boiler includes means to apply controlled heating to water contained in the boiler and a hot water dispensing means activatable to dispense water via the water outlet. The apparatus further includes a plurality of liquid flavour dispensers, each liquid flavour dispenser is selectively activatable to dispense a flavour syrup from a flavour syrup supply and mixer means having an outlet port. The mixer means is in communication with the hopper dispenser outlet, the water outlet and each flavour dispenser and the mixer is adapted to the mix hot drink constituents dispensed therefrom and provide the mixed hot drink constituents at the mixer outlet port. The dispenser apparatus also has a hopper sensor to produce an activation enable signal but, for a predetermined amount of a base powder contained in the hopper, the hopper sensor will produce an activation disable signal. There are a plurality of liquid flavour dispensers, each liquid flavour dispenser is selectively activatable to dispense a flavour syrup from a flavour syrup supply; and user actuable activation means to activate the auger, hot water dispenser and a selected liquid flavour dispenser in response to user manipulation and activation enable signal whereby a user selected flavoured hot drink is dispensed from the mixer outlet port.

In yet another of its aspects, the invention provides a liquid flavouring syrup connector adapted for use with hot drink dispense apparatus comprising a main body forming a passage connecting an inlet and an outlet, means to engage the inlet to a drink dispenser apparatus drink dispenser outlet and at least one liquid supply port formed in the main body with the port in communication with the passage all whereby flavouring syrup supplied to the liquid supply port will flow into the passage.

In yet another of its aspects, the invention provides a method of producing a flavoured hot drink of a selected flavour comprising the steps of: supplying a portion of a base powder, supplying a portion of hot water; supplying a portion of a selected flavouring syrup and mixing each supplied portion to form a flavoured hot drink.

And in yet a further aspect, the invention provides a method of producing a flavoured hot drink comprising the steps of: receiving a flavour selection; and mixing a controlled portion of a base powder with a corresponding controlled portion of hot water and corresponding controlled portion of a selected flavouring syrup.

In a further aspect, the invention provides a method of producing a flavoured hot drink comprising the steps of: receiving a drink selection; producing a flavoured hot drink supply by performing the steps of: supplying a base powder at a predetermined rate; supplying hot water at a corresponding rate; continuously mixing the base powder with the hot water to produce an intermediate hot drink supply. Next, supplying a hot drink flavouring corresponding to the received drink selection and admixing the hot drink flavouring supply with the intermediate hot drink to produce a flavoured hot drink supply and continuing the production of the flavoured hot drink supply until the volume produced corresponds to the received drink selection.

A detailed description of the preferred embodiments of the invention will now be provided with reference to the attached drawings in which like reference numerals have been used for like features of the embodiments throughout the various figures of the drawings.

DETAILED DESCRIPTION OF THE PREFERRED EMBODIMENTS OF THE INVENTION

Figure 1:
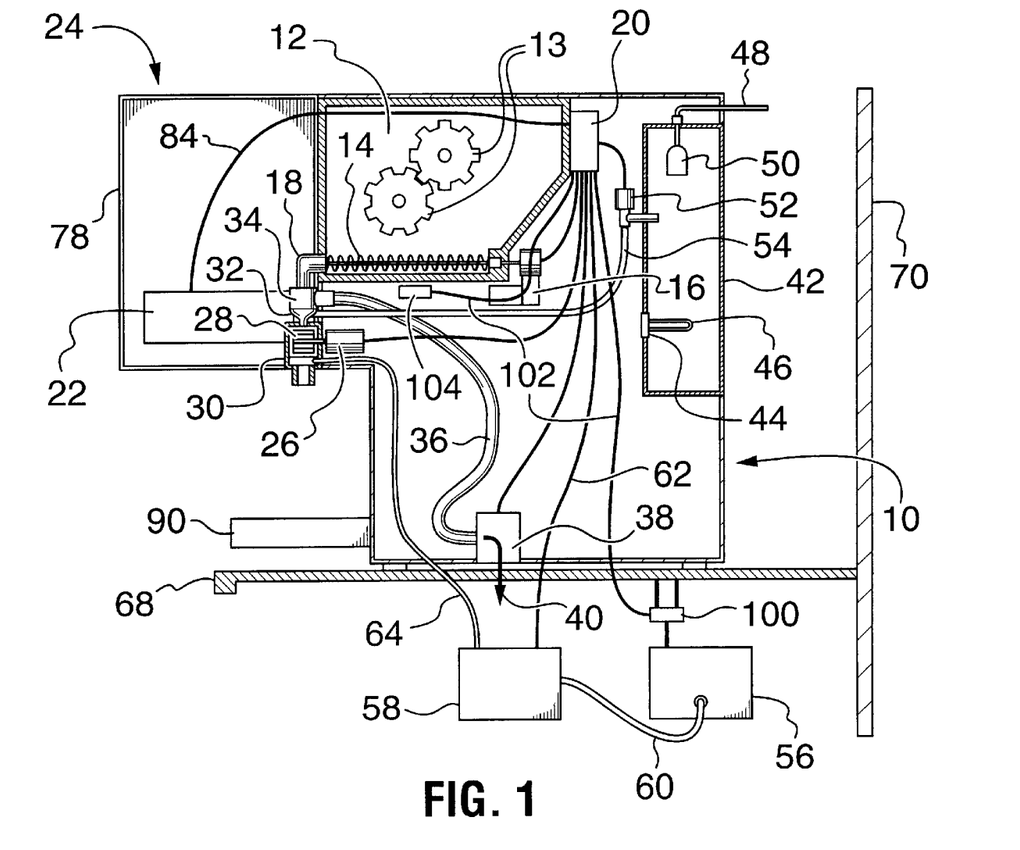
FIG. 1 is a partial cross-sectioned side view of a preferred embodiment of a multi-flavoured hot drink dispenser.

FIG. 1 shows a partial cross-sectioned side view of a preferred embodiment of a multi-flavoured hot drink dispenser constructed in accordance with the principles of the present invention. The dispenser is generally depicted by reference numeral 10 and uses a base powder dispensing system comprising a hopper 12 to hold a base powder. Typically, the base powder will be an unflavoured base powder and the flavour of the hot drink that will be produced will be provided by a flavouring syrup. It will be understood, however, that the base powder may also be a hot chocolate drink powder that is further flavoured by a selected flavouring syrup. The hopper 12 has been cross-sectioned in this view to show internal components. Hopper 12 contains an auger drive 14 which is activated by auger motor 16 to dispense powder out of the powder dispensing nozzle or hopper dispenser outlet 18. Auger motor 16 is controlled and powered by main control board 20. Main control board 20 is electrically coupled to a keypad, the backside of which is visible at 22 on the inside of the door 24 of the dispenser. Contained within hopper 12 are agitators 13 which rotate when auger 14 is activated to cause the powder contained within the hopper to become loose and free and available freely for pickup by auger 14.

Both the base powder and the water enter the mixing system where they are mixed and blended together. The mixing system preferably includes a vacuum funnel 34 which is attached to a blower system. The blower system is employed to extract any powder particles that may be dispersed into the air as the powder is dispensed from the hopper dispenser outlet 18 into the mixing system. In the preferred embodiment of the invention, a vacuum funnel 34 is provided to which a vacuum discharge line 36 is connected. Vacuum discharge line 36 is preferably a flexible tubing which extends between vacuum funnel 34 and blower 38. When activated, blower 38 draws air from vacuum funnel 34 and expels that air via tube 36 and blower 38 outward from the mixing apparatus through a discharge outlet and generally in the direction of arrow 40. Thus the vacuum system is activated to extract any powder particles that may be dispersed into the air as the powder is dispensed from the hopper dispenser outlet 18 and expel such powder particles from the dispenser 10 through the discharge outlet.

The dispenser 10 also includes a hot water dispensing system which is provided to reconstitute the base powder drink constituent. The hot water system comprises a boiler 42 to hold and provide a means for heating the water. The boiler 42 has been shown in sectioned view in this Figure to better illustrate its construction. A heater control 44 senses the temperature of the water and controls the energization of the heating elements 46 which are submersed in the water. A fresh water supply 48 is connected to a source of pressurized domestic water. Water flow into boiler 42 is controlled by means of a level sensing valve 50 that maintains the water level within boiler 42. The boiler 42 includes a dispense valve 52 which is controlled by control board 20 and includes a solenoid means to activate dispense valve 52 to open and close the water supply between boiler 42 and the hot water dispense line 54. Hot water dispense line 54 is connected to mixing funnel 32 whereby when dispense valve 52 is opened, hot water is dispensed into mixing funnel 32 where it will flow into whipping chamber 30 to be mixed with the base powder dispensed thereinto from hopper dispenser outlet 18. The duration and, therefore, the amount of water dispensed by dispensing valve 52 is controlled by main control board 20 and will vary depending on the size of the beverage which the user has selected by depressing a selection key on the keypad on the exterior of the front door 24.

The length of time during which auger 14 will be driven by the auger motor 16 depends on the type and size of drink selected by the user via the keypad 80. The auger 14 controls the amount of base powder that will be dispensed and will depend on the size of drink selected and the type of beverage product flavouring. the amount of base powder dispensed is pre-set to yield the optimal consistency and taste of the hot drink product dispensed. The amount of base powder dispensed by auger 14 can be varied for each and every one of the drink selections the user makes.

When the base powder is dispensed from hopper 12, whipper motor 26 is also activated causing whipper blade 28 to rotate within whipping chamber 30. Whipping chamber 30 has been shown in cross-sectioned form to show whipper blade 28. The base powder emanating from the powder hopper dispenser outlet 18 falls into the mixing funnel 32 where it passes therethrough into whipping chamber 30. Both the base powder and the hot water entering into the mixing system, which is comprised of mixing funnel 32, whipping chamber 30 and, in the preferred embodiment, vacuum funnel 34, come into mixing contact therein to enable the hot water and the base powder to intermix thoroughly. The mixing funnel 32 and whipping chamber 30 are constructed from a plastic material as, preferably, is the whipping blade of whipper 28. Thus, the dispensing of a hot beverage by depressing a button on keypad 80 will result in the simultaneous activation of dispensing valve 52, auger motor 16, whipper motor 26 and blower 38. The associated control lines extending to and from control board 20 and the electrical apparatus under its control are shown in FIG. 1 for clarity. Also controlled by control board 20 is the flavouring system, one flavour of which is shown by way of example in FIG. 1.

The apparatus of the flavouring system uses a liquid flavouring syrup contained within flavour containers, such as a flavour container 56. Flavour container 56 is in communication with a pump system 58 via supply line 60. When activated by control line 62, the liquid flavour syrup from the flavour container 56 is dosed into discharge line 64 where it is transported to be dispensed with the hot drink emanating from discharge nozzle 66 of the dispenser. As will be appreciated, the flavour discharge line 64 will be filled with the flavouring syrup when the dispenser 10 is set up and in use. Therefore, the quantity of flavouring syrup discharged by pump system 58 into one end of discharge line 64 will cause a corresponding amount of flavouring syrup to be discharged from the flavour discharge line 64 at the dispenser nozzle and of the flavour discharge line 64. In this way, the exact dosage or metering of the flavouring syrup into the drink dispensed is controlled.

Flavour lines 64 pass through the frontal portion of dispenser 10 where they are supplied to the dispensing system of the dispenser.

In the arrangement of the flavour system shown in FIG. 1, which is the preferred embodiment, the flavour pump system 58 and associated flavour syrup containers 56 are disposed below counter 68. As will be understood by those skilled in the art, other suitable locations for the flavour syrup containers and pump system remote from the dispenser 10 can be used as well. For example, on a wall 70 behind the dispenser 10 or within the interior of the door 24 of the dispenser 10. Another embodiment of a flavour dispensing system that is wall mounted will be explained in more detail with reference to FIG. 12.

Figure 2:
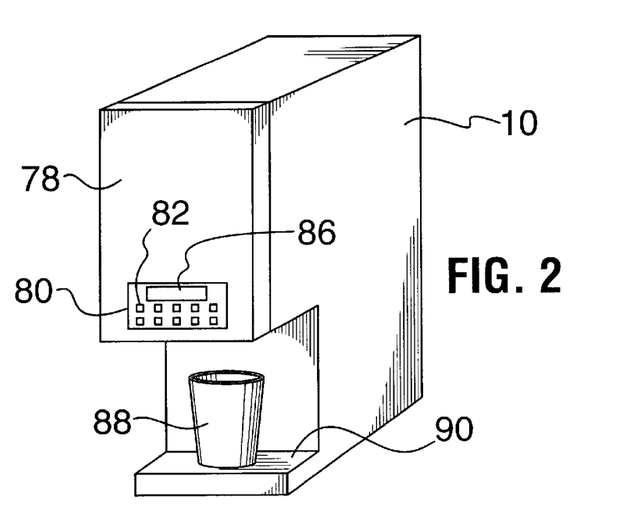
FIG. 2 is a perspective view of the dispenser of FIG. 1.

FIG. 2 shows a perspective view of a hot drink dispenser 10. The dispenser 10 has a front door 78 which is shown in the closed position in FIG. 2. Located on the front door 78 is a keypad 80 which includes a plurality of buttons 82 which are user actuable to initiate dispensing of a hot drink from the dispenser 10. The selected drink is requested by depressing one of the keys 82 located within the keypad 80. The keypad 80 provides separate keys to enable the user to select the desired beverage. The keys enable the user to select what size, for example, small, medium or large, and what flavour drink the user wishes to be dispensed. The keypad 80 is in communication with the main control board 20 by means of a control line 84 shown for example in FIG. 1. The keypad 80 can include a display 86 to provide information to the user, for example, any messages that the control board is programmed to display. The keypad 80 can also be used as a means to program the control board 20 by providing a keyed lock or setup key sequence. When the key sequence is depressed, the control board 20 is placed in programming mode. For example, to set drink parameters such as hot water amount, base powder amount, flavouring amount and so forth.

Based on the drink selection made by the user as indicated by depressing a selected key of keyboard 80, the user selection is communicated to control board 20. Control board 20 then initiates a dispense sequence to control the operation of dispenser 10. The control sequence includes determining and dispensing the quantity of base powder to dispense for the selected beverage, the quantity of water that is required for the selection and the type and quantity of flavouring syrup required for the selection. The control can be effected by control board 20 based on a portion controlled basis. That is to say, when the user depresses a key to make a selection, the controller doses out the hot drink ingredients to produce a hot drink of the size and flavour selected by the user. Alternately, the keys of keypad 80 can be adapted to dispense a drink on a push and hold basis. That is to say, the selected drink flavour will be dispensed for as long as the user depresses the selected key of keypad 80. In either event, the drink is dispensed into a cup 88. In the preferred embodiment, cup 88 rests on a drip tray 90 adapted to support the cup and provide a catch basin for any overflow.

Figure 3:
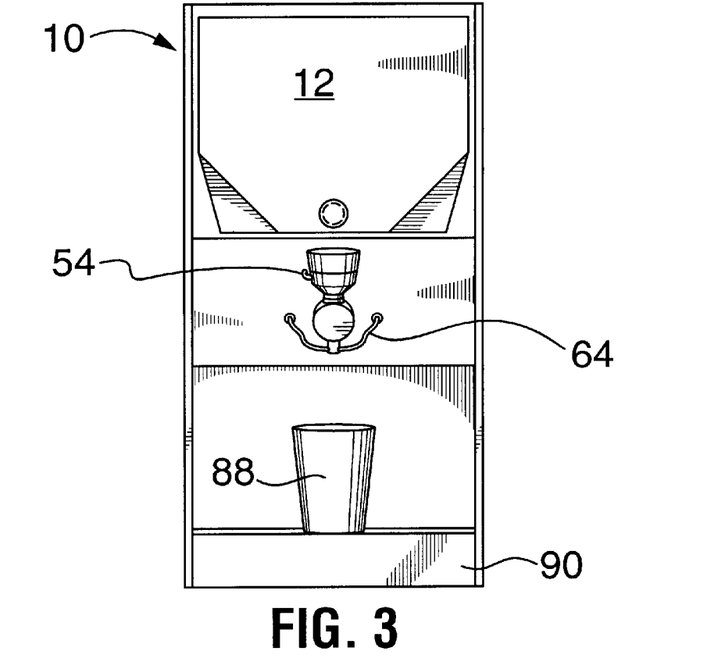
FIG. 3 is a front view of the dispenser of FIG. 1 without the front door.

FIG. 3 shows a front view of the drink dispenser of FIG. 1 with the front door removed for clarity. Hopper 12 extends to substantially occupy all of the upper interior space of the dispenser 10 allowing hopper 12 to hold as generous a supply of base powder as the dimensions of dispenser 10 permit. As there is only one large hopper 12 in the dispenser, the maximum amount of base powder practicable for a given dimensioned dispenser 10 is facilitated, consequently, reducing the frequency of the need to refill powder into the dispenser 10. Also shown in the figure are flavour lines 64 that pass through the frontal portion of dispenser 10 where they are supplied to the dispensing system of the dispenser.

Figure 4:
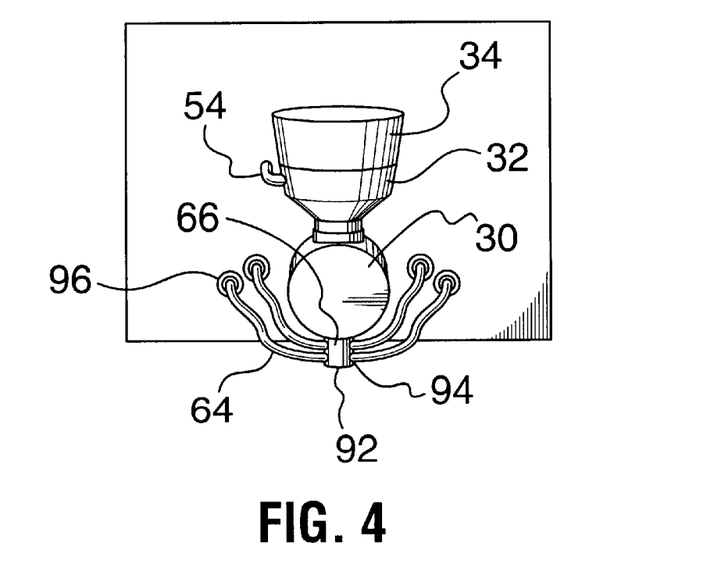
FIG. 4 is an enlarged view of the mixer apparatus of FIG. 3.

FIG. 4 shows a close up view of the dispenser in accordance with the preferred embodiment of the invention. The dispenser has a flavouring dispenser nozzle 92 which attaches to the dispenser nozzle exit 66 of the whipping chamber 30. Flavouring dispenser nozzle 92 has a plurality of flavour supply ports 94 extending from and in communication with the main discharge passage formed by the main body of the flavouring dispenser nozzle 92. The flavouring dispenser nozzle 92 is dimensioned to be slidingly, grippingly retained on exit dispensing nozzle 66 of the mixing chamber 30.

The number of flavour supply ports 94 provided on flavouring dispenser nozzle 92 will be determined by the number of flavours which it is desired to be dispensed by the dispenser 10 to which it is fitted. Each flavour syrup arrives at the flavour dispensing nozzle 92 via its associated flavour discharge line 64. And each flavour discharge line 64 passes through the front portion of the dispenser as shown. For example, two flavour lines 64 are shown in FIG. 3 and four flavour lines 64 are shown in FIG. 4. Preferably, the pass through location of flavour line 64 includes a grommet 96 for protection of the supply line 64. Hot water is supplied to the dispensing apparatus from the hot water dispenser line 54.

Figure 5:
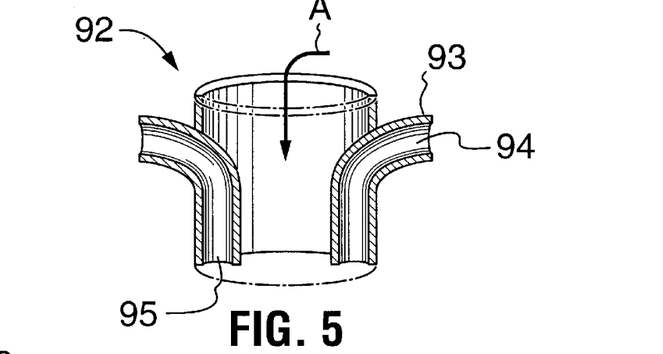
FIG. 5 is a cross-sectioned view of the preferred embodiment of a flavouring dispenser nozzle.

FIG. 5 shows the flavouring dispenser nozzle 92 in cross-sectioned view for clarity of understanding its nature of construction. The flavouring dispenser nozzle 92 is preferably constructed from a plastic material. The stems forming flavour supply ports 94 are preferably, on the flavour supply port inlet portion 93 extending from the dispenser nozzle 92, tubular and have an outside diameter dimensioned to frictionally engage the inner diameter surface of the flavour discharge lines 64 when coupled thereto. The outlet portion 95 of each flavour supply port is proximal to the outlet of the passage, generally depicted by arrow "A" formed by the main body of the dispenser nozzle 92. The flavouring dispenser nozzle or flavouring connector provides a number of flavour supply ports which stem from the location where the flavouring is supplied to the hot drink before it is dispensed from the dispenser. Thus the flavouring connector port configuration is adapted to present a point of entry for the flavour which will not permit cross-contamination of one flavour with another. The flavouring connector can be with a varied number of stems 93 and corresponding supply ports 94 to enable any practical number of flavour ports to be provided to add the flexibility of providing for additional flavours.

Figures 6, 7, 8, 9, 10:
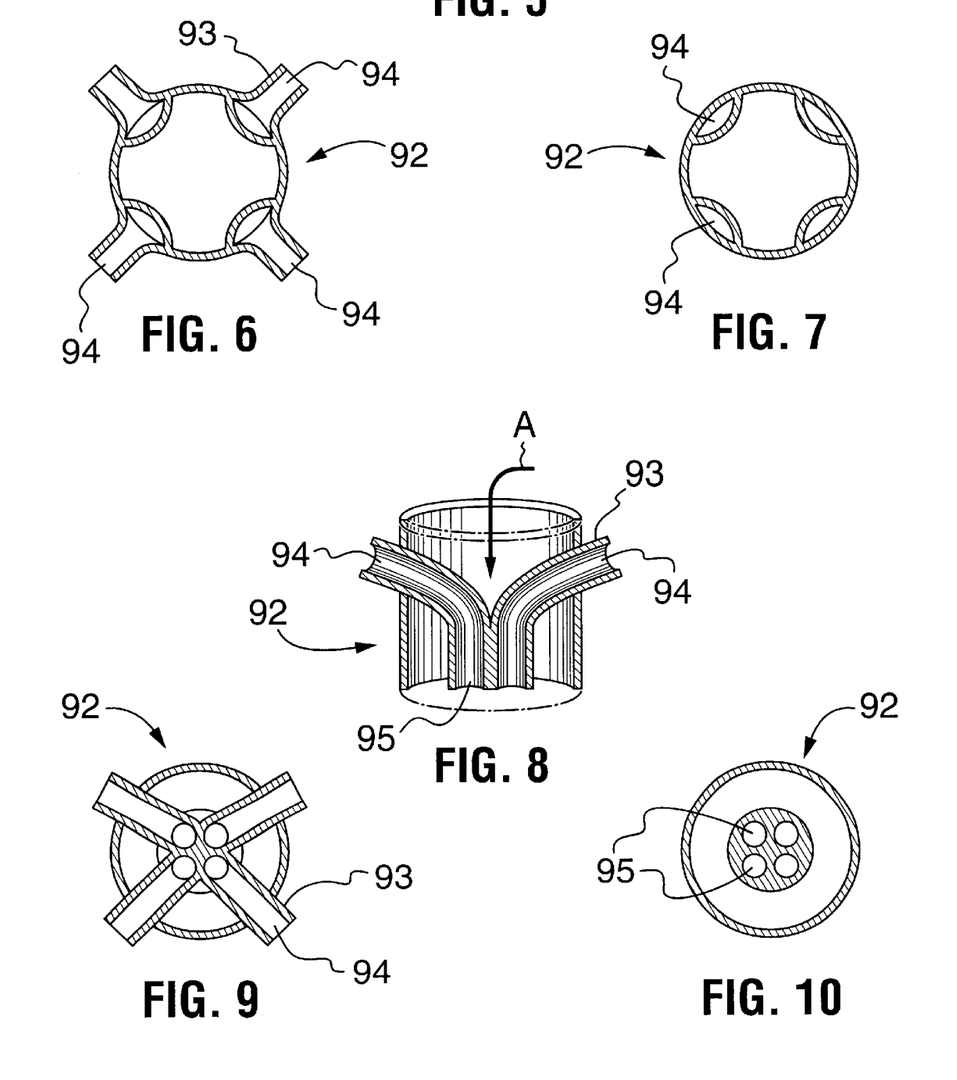
FIG. 6 is a top view of the flavouring dispenser nozzle of FIG. 5.
FIG. 7 is a bottom view of the flavouring dispenser nozzle of FIG. 5.
FIG. 8 is a cross-sectioned view of an alternate embodiment of a flavouring dispenser nozzle.
FIG. 9 is a top view of the flavouring dispenser nozzle of FIG. 8.
FIG. 10 is a bottom view of the flavouring dispenser nozzle of FIG. 8.

While the depiction of the embodiment of the flavour connector shown in FIGS. 5, 6 and 7 show the flavour supply ports extending into the interior volume of the passage A, it will be understood that the body of the connector 92 forming passage "A" may be constructed to provide a smooth circular interior surface shape with the stems 93 extending along the exterior of the connector 92.

FIGS. 6 and 7 show a top and bottom view respectively of the flavour connector of FIG. 5.

FIG. 8 is an alternate embodiment of the flavour connector of FIG. 5. In this embodiment, stems 93 forming the flavour supply ports 94 a positioned proximal to each other in the central region of passage "A" of the flavour connector 92. In this embodiment, as with the embodiment of FIGS. 5, 6 and 7, the discharge or outlet 95 of each flavour supply port 94 is proximal to the exit or discharge of the passage "A" formed by the connector 92 to prevent contamination or cross-mixing of the flavouring syrups from one dispense cycle to the next.

FIGS. 9 and 10 show a top and bottom view respectively of the flavour connector of FIG. 8.

As will be understood, it is possible to permit a combination of flavours to be supplied to the hot drink to be dispensed. That is, multiple flavours can be mixed into one beverage. For example, should a customer want a French vanilla and Irish cream cappuccino mix, the dispenser apparatus can proportionately add mixes of each of the flavours into the hot drink dispensed to satisfy the customer request.

The apparatus and control of the present invention permit an operator to purchase a base unit that can include a number of flavours, for example, four flavours. Additional flavours may be added to the system without requiring additional counter space by simply attaching a flavouring dispenser nozzle 92 that is provided with the number of flavour supply ports 94 to accommodate the additional flavours desired. Each flavour will require appropriate supply apparatus including a flavour discharge line 64, a pump 58, a supply line 60 and the flavour syrup itself in a flavour container 56.

Figure 11:
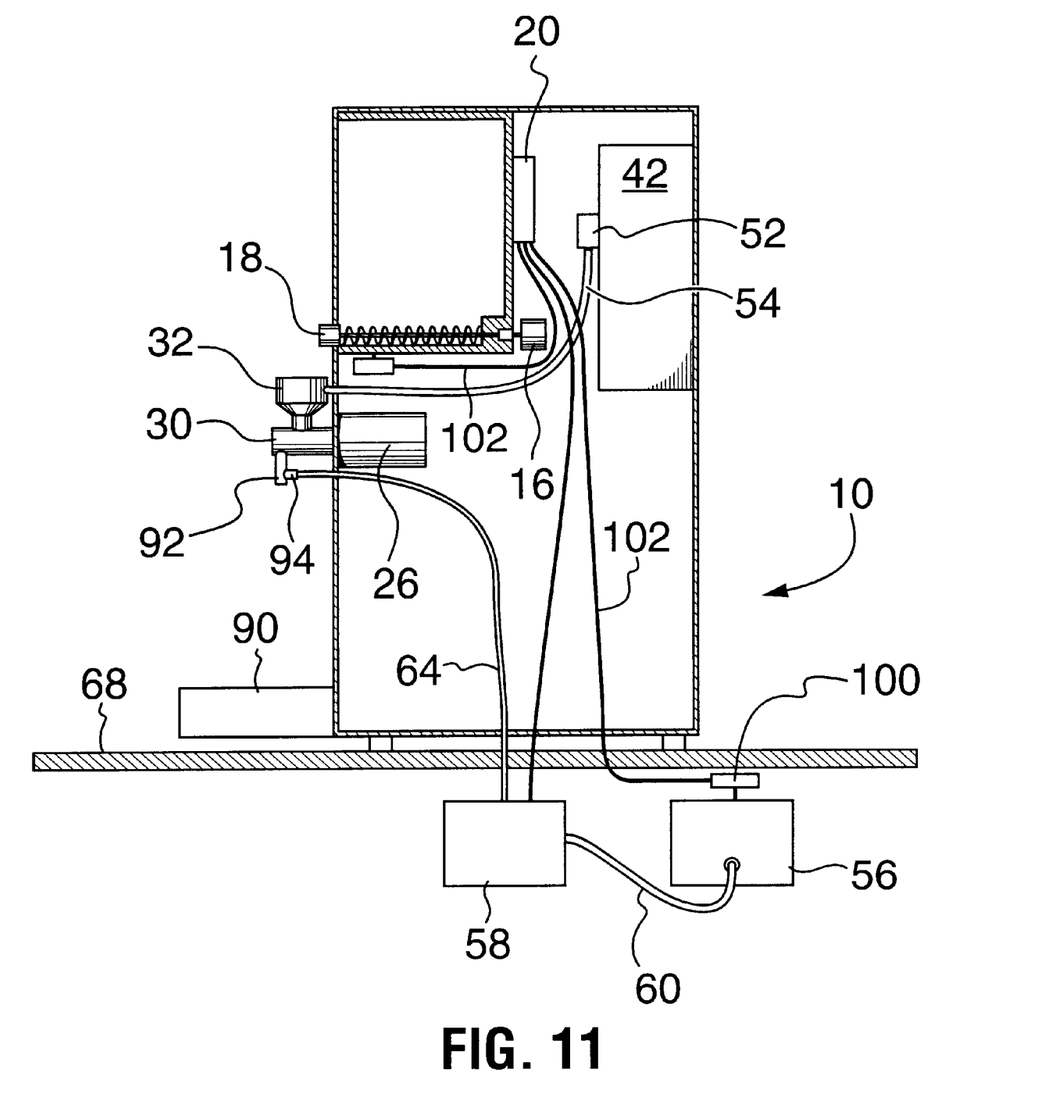
FIG. 11 is a side view in partial cross section of an alternate embodiment of a multi-flavoured hot drink dispenser.

FIG. 11 shows an alternate embodiment of the dispenser 10 which does not have a powder vacuum discharge system. The other elements of the system remain the same. The preferred embodiment of the flavouring system is to include a pumping system 58 for each flavour syrup 56 that is to be dispensed by the dispenser 10. When a selection button on the keypad 80 is depressed, the selected flavour for the hot drink to be dispensed is provided to the dispenser 10 by means of the pump system 58. A plurality of pumps 58 is provided corresponding to the selected plurality of flavouring syrups 56 to be available as flavours for dispenser 10.

Figure 12:
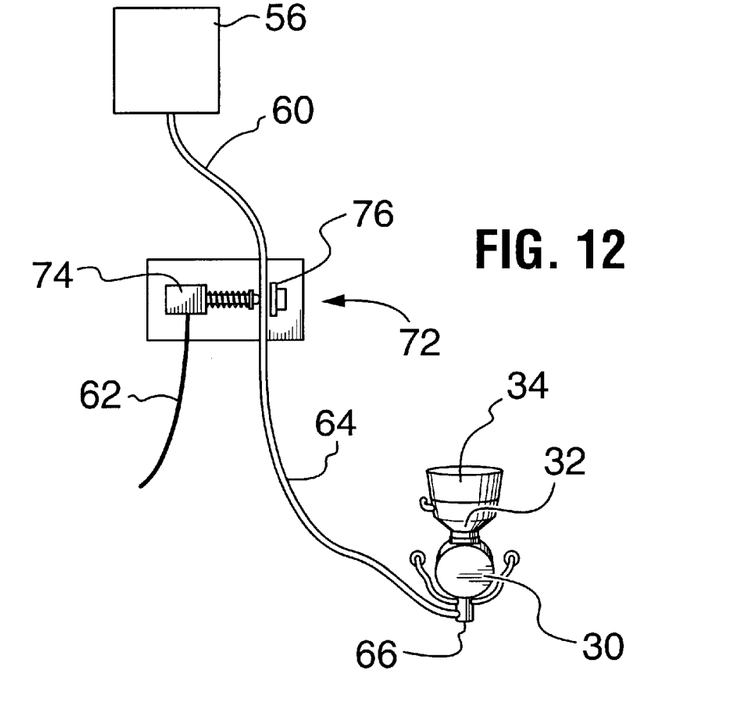
FIG. 12 is a perspective view of a second embodiment of a flavour supply system for use with a multi-flavoured hot drink dispenser.
Figure 12A:
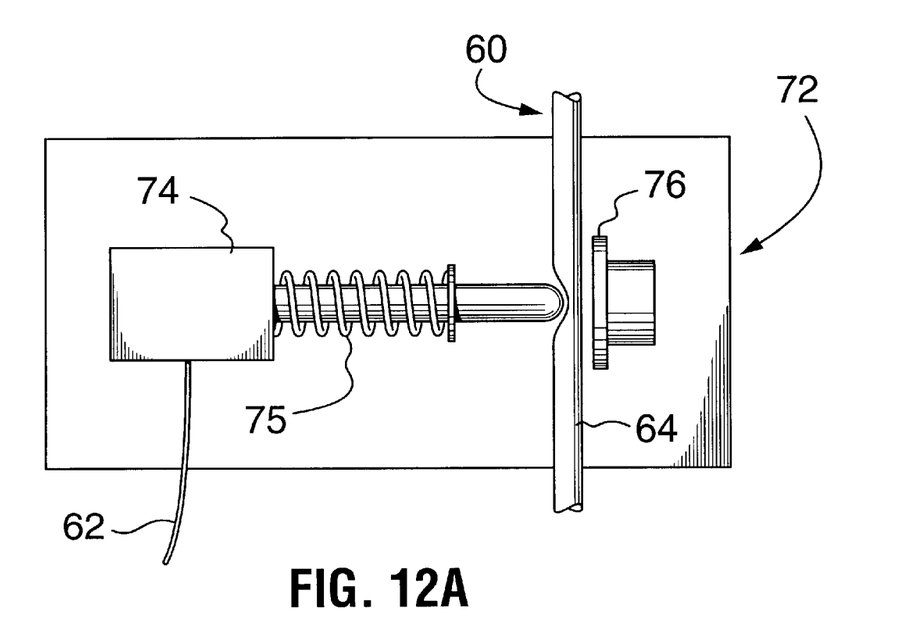
FIG. 12A is an elevation view of the valve mechanism of FIG. 12.

"FIG. 12 shows an alternate embodiment of the apparatus to deliver the flavour syrups to the dispenser. The arrangement of FIG. 12 provides an elevated location for the flavour syrup containers 56, only one of which is shown in the figure, to provide sufficient head or distance between the flavour container 56 and the mixing apparatus 28, 32, 34, and 66 to permit gravity feed of the flavouring syrup. The flavour supply line 60 leads to an aseptic control valve 72. Control valve 72 meters the flavouring fluid supplied to the flavour discharge line 64 thereby to control the quantity of flavouring syrup delivered to the dispensing apparatus. In this embodiment of the flavour delivering system, each syrup flavour tube, only one of which 60 is shown in figure, runs through its own independent aseptic valve 72 or pinching mechanism. The valve mechanism 72 can include a normally closed valve, for example, a spring-loaded push-pull solenoid actuated rod 74 and backstop 76 which is shown in enlarged view in FIG. 12A. The pinch mechanism 72 is used to stop the flow of flavouring syrup to the dispenser apparatus. When the pinch mechanism 72 is at rest, all of the spring load of the solenoid actuated rod 74 is applied to the tubing to close it off from fluid communication between supply line 60 and flavour discharge line 64. Thus, the compression spring 75 forces the rod against the backstop to pinch the tube shut. When the dispenser apparatus is activated in response to the selection made by the user, the solenoid actuated rod 74 will be activated by the control module 20 (of FIG. 1) via control line 62 for a predetermined period of time to allow a metered dose amount of flavouring syrup from the flavour container 56, to enter into flavour discharge line 64. As the flavour syrup enters the discharge line 64, it will be drawn by gravity into and toward mixing apparatus 66 to supply a metered dose of flavouring syrup to the drink being dispensed."

Product Empty System

The apparatus of the present invention preferably includes sensors to monitor the hot drink ingredient supply. The sensors work in conjunction with the main control board 20. Thus the apparatus of the invention serves the needs of the service operators by including apparatus designed to inform a user when the dispenser apparatus is out of any product. The dispenser 10 preferably includes sensors to produce activation enable and activation disable signaling which is used to enable and to prevent the commencement of a product dispense cycle. When activation disable signaling is produced, there is insufficient drink ingredients to produce the selected drink.

For the sensor apparatus provided for the base powder, the base powder hopper 12 rests on a weight sensor 104 which is set to a threshold amount to sense when the base powder product has run low. When the low level has been reached, the main control board 20 a disable condition is signaled via sensor line 102 which causes the main control board to deactivate a dispense cycle for all of the selection buttons on key pad 80. All buttons are deactivated since the base powder is used to make all of the beverages that can be selected from the selection keypad 80. When the weight of the base powder hopper 12 falls below the pre-set threshold, the sensor signaling on line 102 preferably causes the main control board 20 to produce a message on the keyboard display 86 to announce to the user that product is not available. On the other hand, when the base powder hopper rests weight sensor 104 with a sufficient weight to exceed the threshold amount, the weight sensor 104 will produce an activation enable signal that causes the main control board to activate a dispense cycle for all of the selection buttons on key pad 80.

Also, each individual flavouring syrup container 56 is equipped with a sensor mechanism to sense when the flavouring syrup pouch or container is empty. In the preferred embodiment, each pouch or container 56 is suspended from a weight sensor 100 which measures the weight of the flavouring syrup container. When the weight of the flavour container 64 falls below a pre-set threshold, main control board 20 is signaled via sensor line 102 with an activation disable signal. The activation disable sensor signaling on line 102 causes the main control board 20 to produce a message on the keyboard display 86 to announce to the user that the selected product is not available. The activation disable sensor signaling on line 102 also causes main control board 20 to de-activate and ignore the corresponding drink selection switch or key depressed by the user on the key pad 80. Therefore, if a selected flavour syrup is empty, the corresponding beverage cannot be dispensed. On the other hand, when the weight of the flavour container 64 is above the pre-set threshold, main control board 20 is signaled via sensor line 102 with an activation enable signal thereby permitting the unimpeded dispensing operation of the dispenser 10.

Now that the invention has been described numerous modifications, substitutions and equivalents will occur to those skilled in the art. The scope of the invention is not to be limited by the embodiments disclosed herein but is defined by the claims appended hereto.

What is claimed is:

1. An apparatus to dispense a hot drink comprising:
  (a) a hopper with a hopper dispenser outlet including a motor driven auger dispenser along a bottom side thereof operable to dispense a base powder from said hopper dispenser outlet in response to a powder dispense signal;
  (b) a hot water boiler with a water inlet and a water outlet, the boiler including means to apply controlled heating to water contained in the boiler and a hot water dispensing means operable to dispense water via said water outlet in response to a water dispense signal;
  (c) a plurality of liquid flavour dispensers, each liquid flavour dispenser selectively activatable to dispense a flavour syrup from a remotely located flavour syrup supply;
  (d) mixer means having an outlet port, said mixer means in communication with said hopper dispenser outlet, said water dispensing means and each said liquid flavour dispenser, said mixer means adapted to mix hot drink constituents dispensed therefrom and provide the mixed hot drink constituents from said outlet port;
  (e) control means including user activatable selection means to produce said powder dispense signal, water dispense signal and each said flavour dispense signal in response to user activation of said selection means; and
  (f) wherein said hopper, said boiler, said mixer means and said control means are located inside a body of said dispenser apparatus and said flavour syrup supplies are remotely located outside the body of said dispenser apparatus.

2. The apparatus of claim 1 wherein said mixer means further comprises:
   (a) an inlet port formed by said mixer means in communication with an interior mixing chamber; and
   (b) an outlet port formed by said mixer means in communication with said interior mixing chamber opposed from said inlet port.

3. The apparatus of claim 2 wherein said mixer means further comprises:
   (a) a mixer blade disposed within said interior mixing chamber;
   (b) a mixer motor to drive said mixer blade in response to a mix signal; and
   (c) said control means produces said mix signal in response to said user activation of said selection means.

4. The apparatus of claim 1 wherein said flavour dispenser to dispense a flavour syrup comprises:
   (a) a pinch means operable between an open position to dispense said flavour syrup from said flavour syrup supply and a closed position to prevent the dispensing of said flavour syrup supply responsive to said flavour dispense signal; and
   (b) biasing means to bias said pinch means into said closed position.

5. The apparatus of claim 4 wherein said pinch means comprises a solenoid actuated control valve.

6. The apparatus of claim 5 wherein said solenoid actuated control valve comprises a solenoid actuated push-pull rod and spacedly disposed backstop.

7. The apparatus of claim 1 wherein each said flavour dispenser to dispense a flavour syrup comprises:
   (a) pump means operable between a pumping state wherein said flavour syrup is dispensed from said flavour syrup supply and an off state wherein said flavour syrup supply is prevented from being dispensed from said flavour syrup supply responsive to a selected flavour dispense signal.

8. The apparatus of claim 1 further including:
   (a) a vacuum system having a vacuum funnel interposed between said hopper dispense outlet and said mixer means and a discharge outlet disposed remotely from said hopper dispenser outlet; and
   (b) blower means activatable to draw air from said vacuum funnel and expel that air from said discharge outlet, whereby base powder particles dispersed into the air proximal to said vacuum funnel are extracted and expelled through said discharge outlet.

9. An apparatus to dispense a hot drink comprising:
   (a) a hopper with a hopper dispenser outlet including a motor driven auger dispenser along a bottom side thereof activatable to dispense a base powder from said hopper dispenser outlet;
   (b) a hot water boiler with a water inlet and a water outlet, the boiler including means to apply controlled heating to water contained in the boiler and a hot water dispensing means activatable to dispense water via said water outlet;
   (c) a plurality of liquid flavour dispensers, each liquid flavour dispenser selectively activatable to dispense a flavour syrup from a remotely located flavour syrup supply;
   (d) mixer means having an outlet port, said mixer means in communication with said hopper dispenser outlet, said water outlet and each said flavour dispenser adapted to mix hot drink constituents dispensed therefrom and provide the mixed hot drink constituents from said outlet port;
   (e) activation means to activate said auger, hot water dispenser and a selected liquid flavour dispenser in response to user manipulation whereby a user selected flavoured hot drink is dispensed from said mixer outlet port; and
   (f) wherein said hopper, said boiler, said mixer means and said activation means are located inside a body of said dispenser apparatus and said flavour syrups supplies are remotely located outside the body of said dispenser apparatus.

10. The apparatus of claim 9 wherein said mixer means further comprises:
    (a) an inlet port formed by said mixer means in communication with a mixing chamber formed in the interior of said mixer means; and
    (b) an outlet port formed by said mixer means in communication with said mixing chamber, said outlet port opposed from said inlet port.

11. The apparatus of claim 9 wherein said mixer means further comprises
    (a) a mixer blade disposed within said mixing chamber;
    (b) a mixer motor activatable to drive said mixer blade responsive to said activation means.

12. The apparatus of claim 9 wherein said flavour dispenser to dispense a flavour syrup comprises:
    (a) a pinch means operable between an open position to dispense said flavour syrup from said flavour syrup supply and a closed position to prevent the dispensing of said flavour syrup supply responsive to said activation means; and
    (b) biasing means to bias said pinch means into said closed position.

13. The apparatus of claim 12 wherein said pinch means comprises a solenoid actuated control valve.

14. The apparatus of claim 13 wherein said solenoid actuated control valve comprises a solenoid actuated push-pull rod and spacedly disposed backstop.

15. The apparatus of claim 9 wherein said flavour dispenser to dispense a flavour syrup comprises:
    (a) a pump means operable between a pumping state to dispense said flavour syrup from said flavour syrup supply and an off state to prevent the dispensing of said flavour syrup supply responsive to said activation means.

16. The apparatus of claim 9 further including:
    (a) a vacuum system having a vacuum funnel interposed between said hopper dispense outlet and said mixer means and a discharge outlet disposed remotely from said hopper dispenser outlet; and
    (b) blower means activatable to draw air from said vacuum funnel and expel that air from said discharge outlet; whereby base powder particles dispersed into the air proximal to said vacuum funnel are extracted and expelled through said discharge outlet responsive to said activation means.

17. An apparatus to dispense a hot drink comprising:
    a hopper with a hopper dispenser outlet including a motor driven auger dispenser along a bottom side thereof activatable to dispense a base powder from said hopper dispenser outlet;
    (b) a hot water boiler with a water inlet and a water outlet, the boiler including means to apply controlled heating to water contained in the boiler and a hot water dispensing means activatable to dispense water via said water outlet;

(c) a plurality of liquid flavour dispensers, each liquid flavour dispenser selectively activatable to dispense a flavour syrup from a remotely located flavour syrup supply;

(d) mixer means having an outlet port, said mixer means in communication with said hopper dispenser outlet, said water outlet and each said flavour dispenser adapted to mix hot drink constituents dispensed therefrom and provide the mixed hot drink constituents from said outlet port;

(e) a hopper sensor to produce an activation enable signal but, for a predetermined amount of a base powder contained in said hopper, to produce an activation disable signal;

(f) user actuable activation means to activate said auger, hot water dispenser and a selected liquid flavour dispenser in response to user manipulation and said activation enable signal whereby a user selected flavoured hot drink is dispensed from said mixer outlet port; and (g) wherein said hopper, said boiler, said mixer means, said sensor and said activation means are located inside a body of said dispenser apparatus and said flavour syrup supplies are remotely located outside the body of said dispenser apparatus.

18. The apparatus of claim 17 further including:

(a) display means to produce a user perceptible message responsive to said activation disable signal.

19. The apparatus of claim 17 further including:

(a) a liquid flavour sensor for each said liquid flavour dispenser to produce an activation enable signal but for a predetermined amount of flavour syrup in the corresponding a flavour syrup supply, to produce an activation disable signal, wherein said user actuable activation means will not activate in response to user manipulation when any said activation disable signal is present.

20. The apparatus of claim 19 further including:

(a) display means to produce a user perceptible message responsive to each said activation disable signal.

21. A method of producing a flavoured hot drink comprising the steps of:

(a) receiving a drink selection;

(b) producing a flavoured hot drink supply within a body of a dispenser apparatus by performing the steps of:
  (i) supplying a base powder at a predetermined rate;
  (ii) supplying hot water at a corresponding rate;
  (iii) admixing said base powder with said hot water to produce an intermediate hot drink supply;
  (iv) supplying a hot drink flavouring from at least one of a plurality of flavouring syrups remotely located outside the body of the dispenser apparatus corresponding to the received drink selection at a predetermined rate; and
  (v) continuously mixing said hot drink flavouring supply with said intermediate hot drink to produce a flavoured hot drink supply;

(c) continuing said production of said flavoured hot drink supply until the volume produced corresponds to said received drink selection.

22. The method of claim 21 wherein said hot drink selection is indicated by user manipulation of one of a plurality of keys on a key pad.

23. The method of claim 21 wherein the production of said flavoured hot drink supply is continued only during the time when said received drink selection is being received whereby a push and hold production of said flavoured hot drink supply is effected.

24. The method of claim 21 wherein the production of said flavoured hot drink supply is continued from the time when said received drink selection is being received until a predetermined supply is provided whereby a portion controlled production of said flavoured hot drink supply is effected.

* * * * *